Patented Aug. 21, 1951

2,564,788

UNITED STATES PATENT OFFICE 2,564,788

PROCESS OF VULCANIZING RUBBER AND PRODUCT THEREOF

William McGillivray Morgan, Oswestry, England, assignor to Monsanto Chemical Company, St. Louis, Mo., a corporation of Delaware No Drawing. Application June 3, 1949, Serial No. 97,077. In Great Britain June 30, 1948

12 Claims. (Cl. 260—788)

This invention relates to the processing of rubber, and to new accelerators for use in rubber vulcanization.

In the processing of rubber carbon blacks made by the channel process (the so-called channel carbon blacks) are in wide use, especially in the tire industry, and a number of vulcanization accelerators have been developed suitable for use with these channel blacks. There is, however, a possibility that carbon blacks made by the furnace process (known as furnace carbon blacks) may become more widely used than they are at present and replace the channel blacks to some extent, and it has been found that this introduces difficulties in that certain of the vulcanization accelerators in common use are not so suitable with furnace blacks as with channel blacks. This is also true when mixtures of these two types of carbon black are employed.

One of the difficulties which arises is that the rubber stock is liable to "scorch," that is to say for partial and premature vulcanization to occur during the mixing operation in which the carbon black and accelerator, among other substances, are introduced, or during the shaping operation, extrusion or calendering for instance. This difficulty seems to increase with the fineness of the furnace carbon black.

It has now been found that when using furnace carbon blacks, and especially very fine furnace blacks, alone or in admixture with other carbon blacks, eminently satisfactory results may be obtained by means of a mixture of the accelerators N-cyclohexyl 2-benzothiazole sulphenamide and 2,4-dinitrophenyl 2-benzothiazole sulphide. The two accelerators can be added to the rubber stock separately or already mixed, and in either case they form a mixture in the stock and act in conjunction.

This mixture of accelerators has been found to give safe processing, i. e. a limited tendency to scorch, and yet reasonably rapid vulcanization. It will be appreciated that with carbon black stocks which are to be subjected to such processes as extrusion and calendering the ideal rubber accelerator is one which would induce practically no vulcanization at all durig the rolling and shaping, at a temperature of perhaps as high as 110–120° C., but would induce a reasonably rapid vulcanization in the subsequent vulcanization operation, at perhaps 140° C. The difficulty, especially when using very fine furnace blacks, is that if an accelerator is chosen which does not cause excessive vulcanization during the rolling and shaping stages, it may act only slowly during the vulcanization step proper, whereas if one acting reasonably quickly in the vulcanization is chosen there may be a risk of scorching during the earlier stages. The above mixture gives satisfactory results throughout.

It should be added that the above difficulties occur to some extent with all rubber stocks, whether or not carbon blacks are present, and the mixture of accelerators of the present invention is also useful when using only carbon blacks other than furnace black in the stock, and even when carbon blacks are avoided altogether. Moreover, the mixture of the invention appears to have good antioxidant properties and to give a vulcanized product of good resistance to abrasion, and these advantages are of particular value.

The amounts of the two accelerators used depend on the circumstances, for instance on the rate of vulcanization desired, and the proportions of the two accelerators can vary between wide limits. Mixtures in which the ratio of the weight of the N-cyclohexyl 2-benzothiazole sulphenamide to that of the other accelerator is from 5:95 to 40:60 (particularly about 30:70) are especially useful. However, it is to be observed that in general a given quantity of N-cyclohexyl 2-benzothiazole sulphenamide is equivalent to about three times its weight of 2,4-dinitrophenyl 2-benzothiazole sulphide, so that the greater the proportion of the latter the larger the quantity of the mixed accelerator necessary. To give an example, the following quantities of different mixtures would in a rubber stock containing 100 parts by weight of rubber give on full vulcanization products of similar strength and elasticity:

(a) 1 part by weight of a mixture containing 1 part by weight of N-cyclohexyl 2-benzothiazole sulphenamide and 9 parts by weight of 2,4-dinitrophenyl 2-benzothiazole sulphide.

(b) 0.8 parts by weight of a mixture containing 1 part by weight of N-cyclohexyl 2-benzothiazole sulphenamide and 3 parts by weight of 2,4-dinitrophenyl 2-benzothiazole sulphide.

(c) 0.6 parts by weight of a mixture containing equal parts by weight of N-cyclohexyl 2-benzothiazole sulphenamide and 2,4-dinitrophenyl 2-benzothiazole sulphide.

The invention is illustrated by the following examples, from which various improved results ensuing from the use of the mixture of accelerators of the invention as compared with those obtained when either of the accelerators is used separately will be seen.

EXAMPLE 1

A rubber stock of the type used in tire treads and having the composition given below was compounded on a laboratory rubber mill:

|  | Parts by weight |
|---|---|
| Rubber (smoked sheets) | 100 |
| Very fine furnace carbon black | 45 |
| Zinc oxide | 5 |
| Stearic acid | 3 |
| Rosin-paraffin oil softener | 3 |
| Sulphur | 2.5 |
| N - cyclohexyl 2 - benzothiazolesulphenamide | 0.2 |
| 2,4-dinitrophenyl 2-benzothiazolesulphide | 0.5 |

The stock was found to give optimum vulcanization in about 45–50 minutes at a temperature of 141.5° C. in a steam-heated press.

Portions of the stock were tested for scorching properties in the following manner: Pellets in the form of small cylinders 1 cc. in volume and about 1.1 cm. in height were prepared by stamping them out from the sheeted stock and trimming to the stated volume, and where heated at 120° C. for different periods of time by placing them in an aluminum holder which was immersed in a fluid medium (glycerol) maintained at the required temperature under thermostatic control. After varying periods of time samples were removed, cooled rapidly and stored under room temperature conditions for 18 hours, and their plasticity was then tested using a parallel plate plastometer at 70° C. Each pellet was preheated for 15 minutes at 70° C. and then compressed under a load of 5 kilograms for 4½ minutes, and the thickness of the compressed pellet was recorded in hundredths of a millimeter.

Two pellets were tested for each period of heating, and the average thickness (to the nearest 5 hundredths of a millimetre) was termed the "plasticity number."

A curve can be drawn for the stock by plotting the plasticity number against the time of heating at 120° C., and the rate of rise in the plasticity number indicates the measure of scorching, or precure. For convenience, as a rough guide in rapidly comparing results, the time for the plasticity number to reach a figure of 20% above the lowest shown on the curve may be taken as a useful indication of the "scorch time."

Using a stock prepared as described above the scorch time was found to be about 34 minutes, which is quite satisfactory.

To obtain a vulcanized product of similar hardness and modulus of elasticity using one of the two accelerators alone, it would be necessary to employ about 0.37 part by weight of N-cyclohexyl 2-benzothiazole sulphenamide or about 1.1 parts by weight of 2,4-dinitrophenyl 2-benzothiazole sulphide. It was found that in the former case the vulcanization period required was more critical and the stock more susceptible to overcure than with a stock prepared according to the above example. With a similar stock using instead of the mixture of accelerators 1.1 parts by weight of 2,4-dinitrophenyl 2-benzothiazole sulphide alone and optimum vulcanization time at 141.5° C. was as long as 80 minutes.

EXAMPLE 2

A series of rubber stocks were prepared and vulcanized at 141.5° C. as described in Example 1, using the same constituents and quantities except that the amounts of N-cyclohexyl 2-benzothiazole sulphenamide and 2,4-dinitrophenyl 2-benzothiazole sulphide were altered.

The elasticity of the vulcanized products is shown in the following table (the "modulus"—that is to say the stress required to elongate the rubber sample to 300%—being measured by comparative figures, and a corresponding set of figures being given for a stock containing N - cyclohexyl 2 - benzothiazole sulphenamide alone), in which the results using different vulcanization times are given.

Table I

| | Parts by weight of N-cyclohexyl 2-benzothiazole sulphenamide (A) and 2,4-dinitrophenyl 2-benzothiazole sulphide (B) | | | |
|---|---|---|---|---|
| | 0.18(A) 0.42(B) "Modulus" | 0.24(A) 0.56(B) | 0.30(A) 0.70(B) | 0.40(A) |
| 20 mins. vulcanization | 76 | 94 | 105 | 99 |
| 30 mins. vulcanization | 92 | 107 | 118 | 118 |
| 40 mins. vulcanization | 105 | 118 | 125 | 124 |
| 50 mins. vulcanization | 105 | 121 | 128 | 120 |
| 65 mins. vulcanization | 107 | 117 | 127 | 114 |
| 80 mins. vulcanization | 107 | 116 | 128 | 110 |
| 100 mins. vulcanization | 106 | 121 | 128 | |

These figures effectively demonstrate the susceptibility to overcure phenomena of the stock containing N-cyclohexyl 2-benzothiazole sulphenamide alone, as compared with the stocks containing both accelerators.

It will be appreciated that while the invention is primarily concerned with the treatment of natural rubber, and in both the examples natural rubber is used, it is also useful in vulcanizing synthetic rubbers of the type which can be vulcanized with sulphur.

What is claimed is:

1. The process of vulcanizing a sulfur vulcanizable conjugated diene polymer rubber in which there is incorporated sulfur and an accelerator mixture consisting essentially of N-cyclohexyl-2-benzothiazole sulfenamide and 2,4-dinitrophenyl 2-benzothiazole in a weight ratio of 5:95 to 40:60.

2. The process of vulcanizing a sulfur vulcanizable conjugated diene polymer rubber in which there is incorporated sulfur, a furnace carbon black and a vulcanization accelerator which comprises a mixture of N-cyclohexyl 2-benzothiazole sulphenamide and 2,4-dinitrophenyl 2-benzothiazole sulphide wherein said mixture is a weight ratio of 5:95 to 40:60.

3. The process of vulcanizing a sulfur vulcanizable conjugated diene polymer rubber in which there is incorporated sulfur, a furnace carbon black and a vulcanization accelerator which comprises a mixture of N-cyclohexyl 2-benzothiazole sulphenamide and 2,4-dinitrophenyl 2-benzothiazole sulphide wherein said mixture is a weight ratio of approximately 30:70.

4. The process of vulcanizing natural rubber in which there is incorporated sulfur, a furnace carbon black and a vulcanization accelerator which comprises a mixture of N-cyclohexyl 2-benzothiazole sulphenamide and 2,4-dinitrophenyl 2-benzothiazole sulphide wherein said mixture is a weight ratio of 5:95 to 40:60.

5. The process of vulcanizing natural rubber in which there is incorporated sulfur, a furnace carbon black and a vulcanization accelerator which comprises a mixture of N-cyclohexyl 2-benzothiazole sulphenamide and 2,4-dinitrophenyl 2-benzothiazole sulphide wherein said mixture is a weight ratio of approximately 30:70.

6. Rubber which has been vulcanized according to claim 1.

7. Rubber which has been vulcanized according to claim 2.

8. Rubber which has been vulcanized according to claim 3.

9. Rubber which has been vulcanized according to claim 4.

10. Rubber which has been vulcanized according to claim 5.

11. The rubber vulcanization accelerator consisting essentially of a mixture of N-cyclohexyl 2-benzothiazole sulphenamide and 2,4-dinitro phenyl 2-benzothiazole sulphide in a weight ratio of 5:95 to 40:60.

12. The rubber vulcanization accelerator consisting essentially of a mixture of N-cyclohexyl 2-benzothiazole sulphenamide and 2,4-dinitro phenyl 2-benzothiazole sulphide in a weight ratio of approximately 30:70.

WILLIAM McGILLIVRAY MORGAN.

REFERENCES CITED

The following references are of record in the file of this patent:

UNITED STATES PATENTS

| Number | Name | Date |
| --- | --- | --- |
| 2,419,283 | Paul et al. | Apr. 22, 1947 |
| 2,460,393 | Paul | Feb. 1, 1949 |

OTHER REFERENCES

"India Rubber World," of Nov. 1948, pages 208–210.

"Inst. Rubber Ind. Trans.," April 1, 1949, pages 13–36.